US007676049B2

(12) United States Patent
Melanson

(10) Patent No.: US 7,676,049 B2
(45) Date of Patent: Mar. 9, 2010

(54) RECONFIGURABLE AUDIO-VIDEO SURROUND SOUND RECEIVER (AVR) AND METHOD

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 485 days.

(21) Appl. No.: 11/425,976

(22) Filed: Jun. 22, 2006

(65) Prior Publication Data

US 2007/0263890 A1 Nov. 15, 2007

Related U.S. Application Data

(63) Continuation-in-part of application No. 11/383,125, filed on May 12, 2006.

(51) Int. Cl.
*H04R 5/02* (2006.01)
*H02B 1/00* (2006.01)

(52) U.S. Cl. ....................... 381/303; 381/123; 381/306; 381/307

(58) Field of Classification Search ................. 381/303, 381/300, 301, 304, 305, 307, 306, 308, 302, 381/27, 123
See application file for complete search history.

(56) References Cited

U.S. PATENT DOCUMENTS 4,039,755 A * 8/1977 Berkovitz .................... 381/63
5,005,201 A * 4/1991 Rumreich et al. ........... 381/306
5,301,237 A 4/1994 Fosgate
5,598,480 A 1/1997 Kim
5,680,464 A 10/1997 Iwamatsu
5,809,150 A * 9/1998 Eberbach .................... 381/300
5,870,484 A 2/1999 Greenberger
6,057,659 A 5/2000 Akiyama et al.
6,373,955 B1 4/2002 Hooley
6,498,852 B2 12/2002 Grimani
6,665,409 B1 12/2003 Rao (Continued)

OTHER PUBLICATIONS

Murray, John, "Understanding Line Array Systems", Live Sound International, prosoundweb.com, 2006.

(Continued)

*Primary Examiner*—Vivian Chin
*Assistant Examiner*—Douglas J Suthers
(74) *Attorney, Agent, or Firm*—Andrew M. Harris; Mitch Harris, Atty at Law, LLC

(57) ABSTRACT

A reconfigurable audio-video surround sound receiver (AVR) and method provide flexible surround speaker placement and a low cost simulated surround sound implementation. A processing circuit within an audio device or audio/visual (AV) device such as an audio-video receiver (AVR) generates signals for surround and main channel speakers that provide selectable operation between speaker placement in ordinary surround sound installation, or in a simulated surround sound installation with speakers placed at one end of a listening room. An electronic network within the audio device selects between a normal surround sound mode, in which the surround information is provided to surround channel outputs and main channel information is supplied to main channel outputs, or a simulated surround mode in which the main and surround channel outputs receive surround channel information in a phase-controlled relationship, directing the surround information away from a direct path toward the listening area, to diffuse the surround information.

18 Claims, 4 Drawing Sheets

U.S. PATENT DOCUMENTS

| | | | |
|---|---|---|---|
| 6,778,672 | B2 | 8/2004 | Breed |
| 6,937,737 | B2 | 8/2005 | Polk |
| 7,123,731 | B2 | 10/2006 | Cohen et al. |
| 7,382,885 | B1 | 6/2008 | Kim et al. |
| 2001/0038702 | A1 | 11/2001 | Lavoie et al. |
| 2004/0151325 | A1 | 8/2004 | Hooley et al. |
| 2004/0196405 | A1 | 10/2004 | Spinelli |
| 2005/0041530 | A1 | 2/2005 | Goudie et al. |
| 2005/0175194 | A1 | 8/2005 | Anderson |
| 2005/0177256 | A1 | 8/2005 | Shintani et al. |
| 2005/0226425 | A1 | 10/2005 | Polk |
| 2006/0049889 | A1 | 3/2006 | Hooley |
| 2007/0183608 | A1 | 8/2007 | Willems |

OTHER PUBLICATIONS

Polk, Matthew S. “SDA Surround Technology White Paper”, Polk Audio, Nov. 2005.

Product Brochure, Yamaha YSP-1 Digital Sound Projector, 2005.

Product Brochure, Yamaha YSP-1000 Digital Sound Projector, 2005.

* cited by examiner

RECONFIGURABLE AUDIO-VIDEO SURROUND SOUND RECEIVER (AVR) AND METHOD

CROSS-REFERENCE TO RELATED PATENT APPLICATIONS

The present application is a Continuation-in-Part of U.S. patent application Ser. No. 11/383,125, entitled "METHOD AND SYSTEM FOR SURROUND SOUND BEAM-FORMING USING THE OVERLAPPING PORTION OF DRIVER FREQUENCY RANGES", filed on May 12, 2006 by the same Inventor and assigned to the same Assignee. The specification of the above-referenced U.S. patent application and its parent U.S. patent application Ser. No. 11/380,840, entitled "METHOD AND SYSTEM FOR SOUND BEAM-FORMING USING INTERNAL DEVICE SPEAKERS IN CONJUNCTION WITH EXTERNAL SPEAKERS", filed on Apr. 28, 2006, are incorporated herein by reference. The present application is also related to co-pending U.S. patent applications, Ser. No. 11/421,381, entitled "METHOD AND SYSTEM FOR SURROUND SOUND BEAM-FORMING USING VERTICALLY DISPLACED DRIVERS" and Ser. No. 11/425,969, entitled "METHOD AND APPARATUS FOR CALIBRATING A SOUND BEAM-FORMING SYSTEM", by the same inventor and assigned to the same Assignee, which are also incorporated herein by reference.

BACKGROUND OF THE INVENTION

1. Field of the Invention

The present invention relates generally to home entertainment devices, and more specifically, to a reconfigurable audio/video (A/V) device having selectable simulated surround operation or normal surround operation.

2. Background of the Invention

Audio systems in home entertainment systems have evolved along with theatre audio systems to include multi-speaker surround sound capabilities. Only recently have discrete surround signals been available from sources in home entertainment systems and further only recently have encoded sources reached a sufficient level of home use for consumers to justify installation of the requisite equipment. With the development of Digital Versatile Disc (DVD) technology that provides surround audio source information for movies or surround-encoded music, and sophisticated computer games that provide surround audio, surround speaker installation in home environments has become more desirable and frequent. With the recent availability of digital television (DTV) signals, which can include surround audio signals as part of their audio-visual (A/V) information, increasing sales of televisions and/or DTV sets including surround channel outputs are expected. The surround signals may be encoded in a pair of stereo signals, such as early DBX or as in more recent Dolby or THX surround encoding, or may constitute a fully separate audio channel for each speaker, often referred to as discrete encoding.

In most consumer surround audio systems, an amplifier unit, which may be included in an AV receiver or in a television, provides signals to multiple sets of speakers, commonly in what is referred to as a 5.1, 6.1 or 7.1 arrangement. The 5.1 arrangement includes right, center and left main speakers located in the front of the room, and a right-left pair of surround speakers located in the rear of the room for providing an aural environment in which sounds can be psycho-acoustically located such that they emanate from any horizontal direction. The "0.1" suffix indicates that an additional subwoofer is provided for providing low frequency sounds that are typically not sensed as emanating from a particular direction. The 6.1 configuration adds a center channel speaker in the surround speaker set and in a 7.1 configuration, an additional pair of speakers is included over the 5.1 configuration and located even farther back in the room from the surround channel speakers.

However, proper installation of surround channel speakers can be costly and undesirable in many home environments. Wiring must be added and locations with unobstructed paths to the listening area must be available. Since the surround channel audio sources are generated for a particular location of the speakers, they cannot be simply placed at any location in the room and still function properly. It is desirable to position the surround speakers in such a way that the surround sound is diffuse, often limiting possible locations for speaker placement. The term "diffuse" indicates that the sound does not appear to emanate from a single direction, which is generally provided via reflections from or more surfaces that cause the sound to be reflected toward the user from multiple angles.

There are essentially two types of surround sound implementations for handling the additional surround channel information: simulated surround and actual surround. In actual surround sound implementations, surround channel signals are provided to speakers placed behind the listener. In simulated surround implementations, the surround channel signal is provided to speakers placed in front of the listener.

Simulated surround sound implementations typically use filtering and/or delays to alter mono or stereo audio signals to provide outputs for additional front speakers to generate the surround field. U.S. Pat. No. 6,937,737 describes a simulated surround sound system that provides the right and left surround channel information to each side (right and left) of an additional stereo speaker pair as well as to each side of the main stereo speaker pair. The frequency response of the system is controlled to cause the apparent position of the surround channel information to appear wider than the speaker position. However, such systems do not provide surround sound performance approaching that of actual surround sound implementations.

Therefore, beam-forming systems have been developed that provide surround sound fields from encoded or discrete sources that are not only widening systems, but form beams that can direct the sound toward walls and away from the listener, thus providing the surround channel information as reflections. Such systems typically use a large horizontally distributed array of speakers in order to form separate beams for the surround channel sources that direct the surround channel sound away from the listener toward the walls so that the surround channel sounds arrive later and from a different angle. However, such arrays are costly, as separate drivers must be provided for each element in the array. Further, tuning of such an array system can be complicated by the lack of unobstructed paths to the reflection zones at the walls of the room. U.S. published Patent Application 20040151325A1 describes such a large horizontal array beam-forming system and U.S. published Patent Application 20050041530A1 describes a two-dimensional array system that provides a beam focused in both horizontal and vertical planes.

However, since the design of the simulated surround sound array systems differs from that of an ordinary surround sound system, the consumer must choose one or the other and install the system appropriately using either dedicated surround channel speakers located in the rear of a room or purchasing an array system specifically designed to provide beam-forming surround sound simulation. Further, in ordinary surround sound system installations, the speaker placement is restricted to placement of speakers toward the rear of the listening room in order to achieve a suitable surround sound listening experience.

Therefore, it would be desirable to provide an audio device or A/V receiver that provides selectable operation as either a simulated surround sound system with speaker placement at one end of a room, or as an ordinary surround sound system with surround speaker placement at the rear of a listening room. It would further be desirable to provide an audio device or A/V receiver that provides flexibility in surround speaker placement. It would further be desirable to provide such a device or A/V receiver with low incremental cost in providing such reconfiguration capability.

SUMMARY OF THE INVENTION

The above stated objectives of providing a device in which simulated surround sound operation or ordinary surround sound operation is selectable, allowing for flexible surround speaker placement, is provided in a device and method and may further be incorporated in a system providing reconfigurable surround sound operation. The method is a method of operation of the device or a system incorporating a device in accordance with an embodiment of the invention.

The device, which is generally an audio-video (A/V) receiver (AVR) that includes main channel and surround channel outputs for either powered speakers or non-powered speakers. In a normal surround sound operating mode, the surround channel outputs receive surround channel information and the main channel outputs receive main channel information. In a simulated surround sound operating mode, the main channel outputs receive signals generated from both the surround channel and main channel information and the surround channel outputs receive signals generated from the surround channel information and optionally also the main channel information.

In the simulated surround operating mode, the surround and main outputs are controlled by an electronic network that provides a controlled phase response between the surround channel information provided to the main channel outputs and the surround channel information provided to the surround channel outputs, so that the surround channel information is propagated by speaker connected to the surround and main channel outputs in a directivity pattern differing substantially from that of the main channel outputs, thus directing the surround channel information away from the listening area so that the surround channel information is diffused by reflection before reaching a listener.

The above-described objectives, features, and further advantages of the invention are described in more detail below, in conjunction with the accompanying drawings, in which like reference numerals indicate like elements.

BRIEF DESCRIPTION OF THE DRAWINGS

Details of the invention and the uses thereof will be understood by a person of skill in the art when reading the following description in conjunction with the accompanying drawings. Further objectives and advantages presented by the invention will be apparent in light of the following description and drawings, wherein like reference numerals indicate like components, and.

DESCRIPTION OF ILLUSTRATIVE EMBODIMENT

The present invention encompasses audio devices (and audio-video devices) that provide selectable operation between a normal surround sound operating mode and a simulated surround operating mode that diffuses the surround channel information away from the listening area via beamforming. The selectable operation permits placement of speakers either in a traditional surround sound arrangement, i.e., surround speakers placed behind the listening area, or placement at the front of the room in a simulated surround sound environment, as disclosed in the above-incorporated U.S. patent applications. In simulated surround mode, beam forming between the main speakers and surround speakers diffuses the surround channel information via reflections of one or more beams directed away from the listening area, e.g., at side walls or the ceiling of the room.

Figure 1:
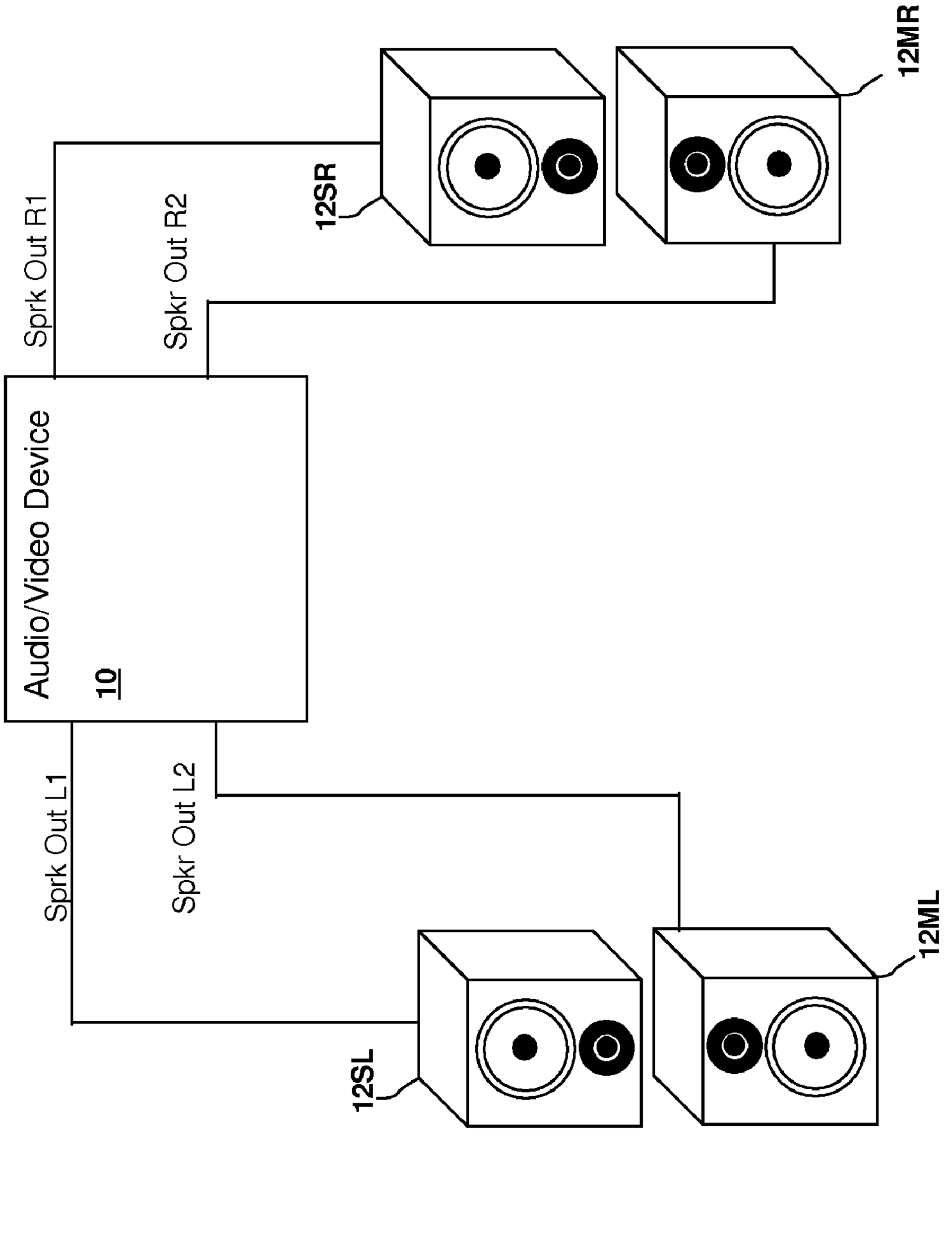
FIG. 1 is a pictorial diagram of a system incorporating a device in accordance with an embodiment of the present invention.

Referring now to the Figures, and in particular to FIG. 1, a system in accordance with an embodiment of the present invention is illustrated. The illustrated system is an audio/video (AV) device 10, such as an audio/video receiver (AVR) connected to external pairs of speakers 12ML, 12SL and 12MR, 12SR, each having a corresponding speaker output connection at device 10. Each speaker 12ML, 12SL, 12MR and 12SR is shown as including two drivers such as a tweeter and a woofer, but such arrangement is not a requirement of the present invention. For example, surround speakers 12SL and 12SR may be “full-range” drivers with a bass response inferior to that of the main speakers 12ML and 12MR and the non-directional very low frequency information from both main and surround channels may be provided only to main speakers 12ML and 12MR without any loss in surround sound performance.

Figure 2:
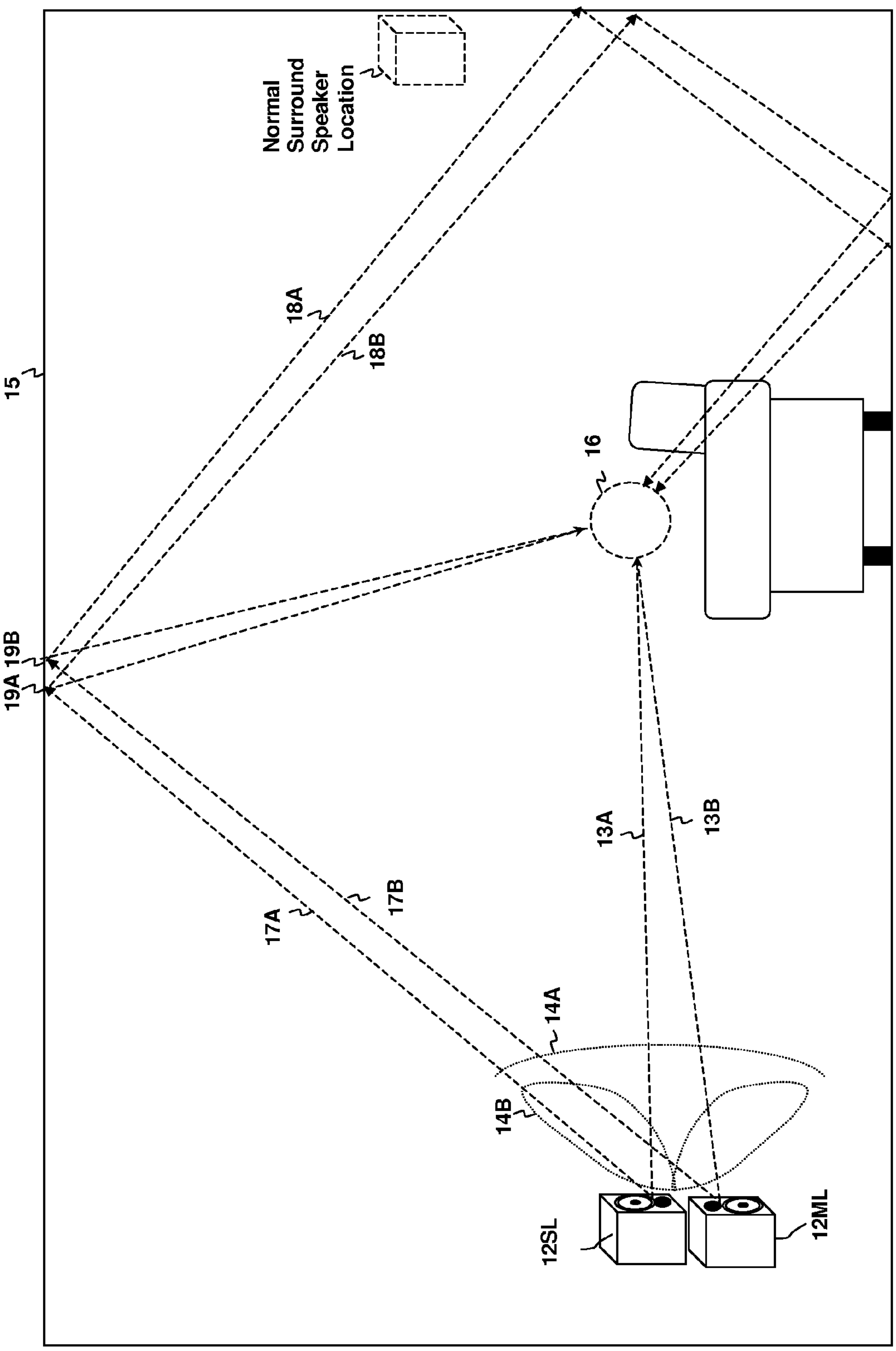
FIG. 2 is a side view of a listening environment including a system having a device in accordance with an embodiment of the present invention.

Referring now to FIG. 2, a side view of a listening environment including the system of FIG. 1 is depicted. Only one set of (left) speakers 12ML, 12SL is shown for clarity, but it is understood that speakers 12MR and 12SR will be located on the same wall, but displaced in the direction into the Figure. The main channel information reproduced through speakers 12ML, 12SL, 12MR and 12SR propagates along a direct path 13A, B from pattern 14A, providing the first arrival of main channel sounds at a listening area 16. In simulated surround mode, the surround channel mid-range information is provided to both speakers of each pair 12ML, 12SL and 12MR, 12SR and is phase-aligned in a substantially out-of-phase relationship for mid-rang frequencies as between speakers 12ML and 12SL as well as between speakers 12MR and 12SR, so that a null in pattern 14B is produced along direct path 13A, B. Due to the spacings between speakers 12ML, 12SL and 12MR, 12SR, and the phase vs. frequency relationship maintained between speakers 12ML, 12SL and 12MR, 12SR, the surround channel information is propagated along path 17A, 17B. The surround channel information is reflected at points 19A, 19B of ceiling 15 and is reflected toward listening area 16 and/or along paths 18A, 18B, which cause the surround channel information to arrive much later at listening position 16 and to be heard as diffuse (non-directional).

Normal surround speaker location is shown in the Figure at the rear wall of the room behind listening area 16. If the speakers 12SR and 12SL are relocated to the normal surround speaker location indicated, then the normal operating mode is selected at device 10 and only surround channel information is provided to speakers 12SR and 12SL, and no beam-forming is performed. Low frequency surround channel information may be routed to speakers 12MR and 12ML as is selectable in some existing surround sound systems. However, the primary difference in the mode selection of the present invention and any selectable operating modes in existing systems, is that selection is made between a mode for operating speaker pairs 12ML, 12SL and 12MR, 12SR in close proximity (e.g., <1 m spacing) and a mode for operating speaker pairs 12ML, 12SL and 12MR, 12SR at normal surround placement distances, e.g., the full depth of the room, or a distance at least exceeding 1 m.

The illustrated forward-facing on-axis alignment of the speakers is not a limitation of the present invention, as some simulated surround speaker arrangements as disclosed in the above-incorporated U.S. patent application "METHOD AND SYSTEM FOR SURROUND SOUND BEAM-FORMING USING VERTICALLY DISPLACED DRIVERS" may include side-facing and upward-facing speakers or speaker elements. It is to be understood that such arrangements can also be used with device 10 when in simulated surround operating mode, and in embodiments where the speaker pairs are detachable, can also be used to provide both speakers in the normal surround placement mode. Alternatively, if such speakers are not detachable, they can be used to provide either the main channel or surround channel portion of a normal surround installation and provided with non beam-forming signals.

In essence, device 10 is provided with a "normal" operating mode for use with a standard surround sound speaker installation, e.g., a 5.1 or 7.1 speaker set, when placed in a standard surround sound configuration. Device 10 is further provided with a "simulated surround" operating mode, in which the standard rear speakers can be placed in the front of the room to beam-form with the main speakers, or in which special speakers as disclosed in any of the above-incorporated U.S. patent applications can be employed in a simulated surround-sound configuration. For example speakers having differing-frequency driver pairs, as disclosed in the above-incorporated parent U.S. patent application, "METHOD AND SYSTEM FOR SURROUND SOUND BEAM-FORMING USING THE OVERLAPPING PORTION OF DRIVER FREQUENCY RANGES", can be provided with overlap-range beam-forming signals as disclosed therein by device 10 in simulated surround operating mode. In normal operating mode, standard surround speakers can be then used with device 10 and placed in a standard configuration. (The special speakers disclosed in the above-referenced U.S. patent application could be used as either front or rear speakers in standard configuration, as well, with signals provided only to the main channel inputs of the beam-forming speakers.)

Further, the techniques of the present invention are also applicable to devices such as the DTV described in the above-incorporated (grandparent) U.S. patent application "METHOD AND SYSTEM FOR SOUND BEAM-FORMING USING INTERNAL DEVICE SPEAKERS IN CONJUNCTION WITH EXTERNAL SPEAKERS." Device 10 can in fact be such a device, in which one set of speaker outputs is provided to internal speakers of device 10 (not shown) and the other set of speaker outputs is provided to external speakers that can either be located adjacent to device 10 in simulated surround sound operating mode, or placed in the rear of the listening area 16 with device 10 operating in normal surround mode.

In general, the present invention relates to providing selection between generating signal outputs from device 10 for operating in beam-forming simulated surround sound environments for situations where actual rear speaker placement is either not possible or not desirable, and operating in configurations where actual rear speaker placement is present. As such, any of the techniques of the above-incorporated U.S. patent applications, as well as other simulated surround techniques, can be selectively applied when needed, and normal rear-placement operation can still be provided by devices in accordance with the present invention when practical and desirable.

Figure 3:
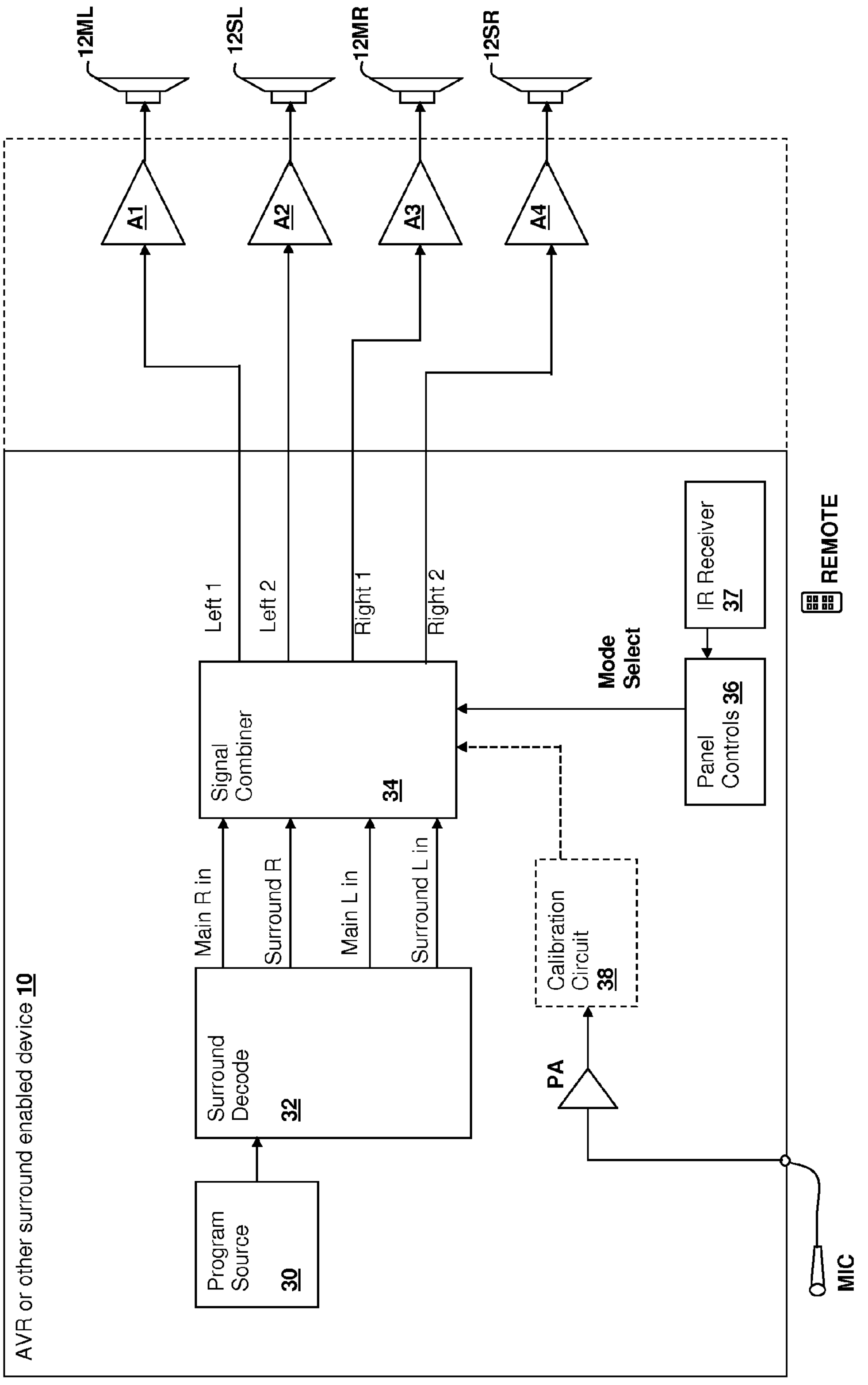
FIG. 3 is a block diagram of the system depicted in FIGS. 1-2.

Referring now to FIG. 3, a block diagram of circuits within the system of FIG. 1 is shown. An AVR or another surround-enabled device 10 includes a program source 30, which may also be provided or selected from an external connection, that supplies a surround decode circuit 32 with program information. Surround decode circuit 32 provides main channel and surround channel outputs to a signal combiner network 34. In applications in which program source 30 does not contain surround channel information, surround decode circuit 32 can include a surround synthesizer circuit for synthesizing surround information from a stereo program.

Signal combiner network 34 combines the surround channel information and main channel information to provide signals to the inputs of amplifiers A1-A4, which may be located internal to device 10, or external to device 10, such as within the cabinets of speakers 12ML, 12SL, 12MR and 12SR or in an external amplifier unit coupling device 10 and speakers 12ML, 12SL, 12MR and 12SR.

An optional calibration circuit 38 may be included and connected to a microphone MIC input via a preamplifier PA. Microphone MIC is ideally an omni-directional microphone, so that all responses with respect to a given speaker or combination of speakers is detected during calibration. When all of the electronics and drivers are included within device 10, it is advantageous to provide calibration circuit 38 and tunable filters within signal combiner network 34 so that the directivity patterns associated with the main and surround channel information can be optimized to a particular room and installation, when simulated surround sound mode is selected. Additionally, the filters and calibration circuit 38 can also be optionally used in normal surround operating mode to improve surround performance. Calibration of the various types of beam-forming embodiments is disclosed in the above-incorporated U.S. patent applications.

Selection between simulated surround operating mode and normal surround operating mode may be made via front panel controls 36, via commands received from a remote control unit REMOTE, through infrated (IR) interface 37, or via a cabling/connector configuration that selects between the operating mode depending on attachment of particular speakers designated for particular installation mode. For example, if a beam-forming speaker set is included completely within device, selection of "normal" surround operating mode may be made automatically in response to connection of external surround channel speakers.

Figure 4A:
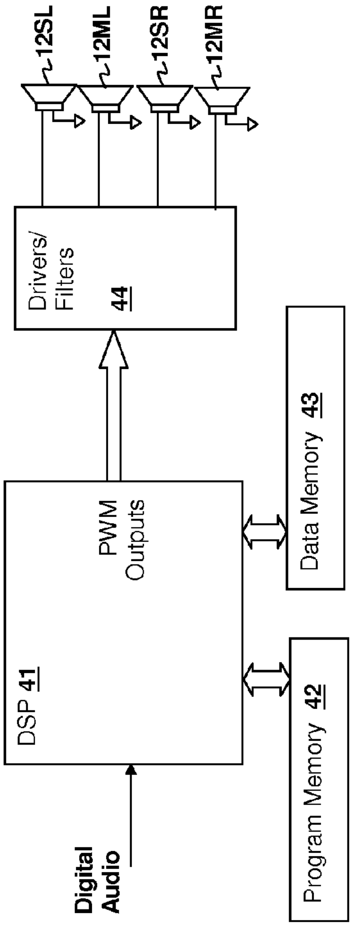
FIG. 4A is a block diagram of a system in accordance with another embodiment of the present invention.

Referring now to FIG. 4A, a system in accordance with an embodiment of the present invention is shown. The depicted system employs a digital signal processor (DSP) 41 that performs the signal combining/filtering functions, as well as frequency-band splitting and any compression/protection algorithms used in the system. DSP 41 also performs the mode selection of the present invention, supplying appropriate standard surround signals to the speaker outputs when normal surround mode is selected and beam-forming signals when simulated surround sound operation is selected. DSP 41 is coupled to a program memory 42 containing program instructions forming a computer program product in accordance with an embodiment of the present invention, and further coupled to a data memory 43 for storing data used by the computer program and results produced thereby. The outputs of DSP 41 are depicted as pulse-width modulator (PWM) outputs for each channel, with corresponding low-pass filters and driver transistors 44, generally half-bridge circuits with series LC filters connected to speakers 12ML, 12SL, 12MR and 12SR. The signal combining, filtering and compression operations performed by the algorithms of the computer program embodiment will be described in further detail below in illustrations that apply to discrete circuits as well as the algorithms executed by DSP 41.

Figure 4B:
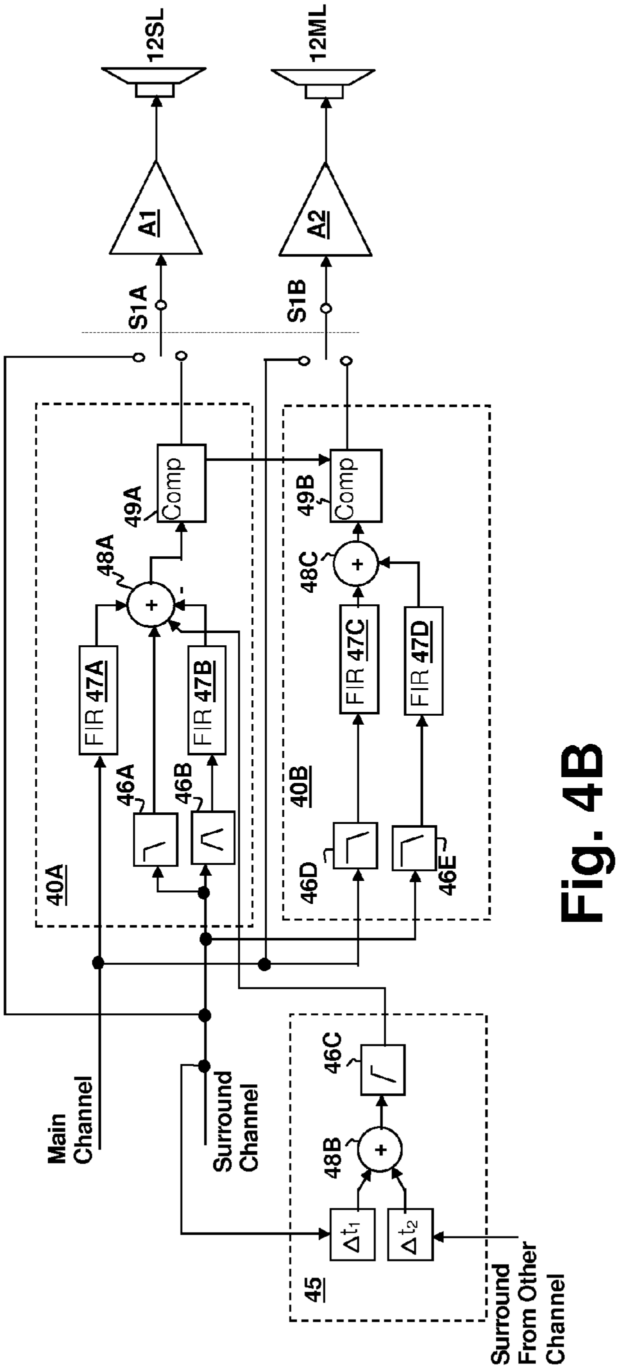
FIG. 4B is a block diagram of a system in accordance with yet another embodiment of the present invention.

Referring now to FIG. 4B, a direct and surround channel circuit or algorithm in accordance with an embodiment of the present invention is shown in a block diagram. Only one stereo side (right or left) of the system is shown with respect to a first driver processing block 40A and second driver processing block 40B, as the other side will generally be an identical circuit. However, a common high-frequency surround channel diffusion block 45 is shown that includes differing delays ?$t_1$, ?$t_2$, and a summer 48B to combine the delayed right and left surround channel signals, Diffusion block 45 further includes a high-pass filter 46C to provide the diffused high-frequency surround information to a combiner 48A within high-frequency processing block 40A. Combiner 48A supplies the signal provided to speaker 12SL through amplifier A1 and compressor 49A. Switch S1A selects between normal surround operating mode (upward position), in which the surround channel signal is supplied to amplifier A1 and simulated surround operating mode (downward position), in which the output of processing block 40A is supplied to amplifier A1.

Processing block 40A includes a low frequency filter 46A for the surround channel which provides a surround channel low-frequency input to combiner 48A and a bandpass midrange filter 46B for providing the midrange beam-forming portion of the surround channel signal, which is provided in negative polarity to combiner 48A. Optional finite impulse response (FIR) filters 47A and 47B provide for adjustment of main channel and surround channel phase vs. frequency response for calibrating the system. It is understood that while FIR filters have been chosen for the exemplary embodiments depicted herein, that other digital filters suitable for use in providing the phase-frequency response may be employed and are considered as contemplated herein for that purpose. Compressor 49A acts to limit excessive levels provided to driver 12SL generated by the beam-forming operations that might damage driver 12SL or clip amplifier A1. Compressor 49A can be alternatively located between FIR filter 47B and combiner 48A in order to compress only the surround channel information within the signal provided to amplifier A1 and speaker 12SL.

Processing block 40B provides the signal to speaker 12ML through amplifier A2 when switch S1B is in the downward position (simulated surround operating mode). When switch S1B is in the upward position (normal surround operating mode), amplifier A2 receives the main channel input signal. However, as mentioned above, other alternatives are possible and the mode selection of the circuit of FIG. 4B is only illustrative. For example, alternative switching configurations could be provided that provide low frequency information from both the surround and main channel inputs only to the amplifier A2 and such operation may also be made selectable as a sub-operating mode of the normal surround sound operating mode.

Processing block 40B includes a low-pass filter 46D for the main channel and a similar low-pass filter 46E for the surround channel. Filters 46D and 46E provide the low and midrange frequency components of the main and surround channel signals, respectively to a combiner 48C that combines the outputs of filters 46D and 46E. Optional FIR filters 47C and 47D provide for adjustment of main channel and surround channel phase vs. frequency response for calibrating the system in simulated surround sound operating mode. An optional compressor 49B acts to prevent amplifier clipping or speaker damage when the increased gain of either filter 46E or FIR filter 47D raises the gain of processing block 40B with respect to the surround channel information in order to beam-form. Also, if compressor 49B receives control signals from compressor 49A, the match in level between the signals provided to drivers 12SL and 12ML can be maintained for beam-forming while compressor 49A is acting to protect driver 12SL and/or prevent clipping in amplifier A1.

The description provided above constitutes a description of the preferred embodiments of the invention, but the invention is not limited to the particular implementations shown or described. Those skilled in the art, having seen the above description and accompanying drawings, will understand that changes in form, structure and other details, as well as the order of operation of any operative steps may be varied without departing from the spirit and scope of the invention.

What is claimed is:

1. A method for providing selective operation of surround channel speakers in configurations wherein said surround channel speakers are placed in close proximity to main channel speakers or in configurations wherein said surround channel speakers are placed in locations distant from the main channel speakers by more than one meter, comprising:

receiving a selection indication directing simulation of a surround sound environment for said close proximity speaker configuration;

receiving main channel information;

receiving surround channel information;

responsive to said selection indication directing simulation of said surround sound environment, generating a first speaker output signal and a second speaker output signal in dependence on both said received main channel and said received surround channel information according to a controlled signal relationship, such that propagation of said surround channel information is provided in a directivity pattern having substantial attenuation along a direct path to a predetermined listening position and at least one lobe having a directivity peak directed away from said predetermined listening position;

receiving another selection indication indicating that said surround sound environment is not to be simulated; and responsive to receiving said other selection indication, generating said first speaker output signal from the received main channel information and generating the second speaker output signal from said received surround channel information, such that the main channel information and the surround channel information are provided separately in the first and second speaker output signals.

2. The method of claim 1, further comprising:

receiving a sub-mode selection indication that low-frequency surround channel information is to be directed to said main channel speakers; and responsive to receiving said sub-mode selection indication, generating said first speaker output in conformity with a low-frequency portion of said surround channel information.

3. The method of claim 1, further responsive to receiving said other selection indication indicating that said surround sound environment is not to be simulated, generating said first speaker output signal in conformity with only said received main channel information within a midrange beam-forming frequency band.

4. The method of claim 1, wherein said generating generates said first speaker output signal and said second speaker output signal in a controlled frequency-dependent phase response to said surround channel information for providing said directivity pattern.

5. The method of claim 4, wherein said generating comprises:

filtering said surround channel information through a first digital filter to provide said first speaker output signal;

filtering said surround channel information through a second digital filter to provide said second speaker output signal; and adjusting said first and second digital filters to provide said controller frequency-dependent phase response.

6. The method of claim 1, wherein said generating generates said first speaker output signal to include low frequency portions of both said main and surround channel information, generates said second speaker output signal to include high frequency portions of both said main and surround channel information, and generates said first and second speaker output signals to include midrange portions of said surround channel information in said controlled signal relationship, whereby only a midrange portion of said surround channel information is provided in said directivity pattern.

7. The method of claim 1, wherein said generating generates said first and second speaker output signals as line-level signals for connection to one or more powered speaker cabinets.

8. The method of claim 1, wherein said generating amplifies results of said generating to provide said first and second speaker output signals as power output signals for connection to one or more non-powered speaker cabinets.

9. An electronic device, comprising:

a first audio output;

a second audio output; and an electronic circuit for receiving surround channel information and main channel information and supplying a first signal to said first audio output and a second signal to said second audio output, wherein said electronic circuit has a selectable operating mode, wherein at least one of said first and second signals are generated in dependence on both said surround channel information and said main channel information when a first operating mode is selected, and wherein said first signal and said second signal have a controlled response to said surround channel information when said first operating mode is selected, such that propagation of said surround channel information is provided in a directivity pattern having substantial attenuation along a direct path to a predetermined listening position and at least one lobe having a directivity peak directed away from said predetermined listening position, when a pair of speakers in proximity of less than one meter are each coupled to a corresponding one of said first and second audio outputs, and wherein said electronic circuit generates said first signal in conformity with said received main channel information and generates said second signal in conformity with said received surround channel information when a second operating mode is selected, such that the main channel information and the surround channel information are provided separately in the first and second signals.

10. The electronic device of claim 9, wherein said electronic circuit generates said first signal in conformity with said main channel information and a low-frequency portion of said received surround channel information when a first sub-mode of said second operating mode is selected.

11. The electronic device of claim 9, wherein said electronic circuit generates said first signal in conformity with only said received main channel information within a midrange beam-forming frequency band when said second operating mode is selected.

12. The electronic device of claim 9, wherein in said first operating mode, said electronic network provides a controlled frequency-dependent phase response with respect to said surround channel information between said first and second signals, such that a directivity pattern differing from that of said main channel information is provided when said pair of speakers is coupled to said first and second audio outputs.

13. The electronic device of claim 12, wherein said electronic network comprises:

a first digital filter for controlling a response of said first audio output to said surround channel information; and a second digital filter for controlling a response of said first audio output to said surround channel information.

14. The electronic device of claim 9, wherein said electronic circuit provides said first and second audio outputs as line-level signals for connection to a pair of powered speakers.

15. The electronic device of claim 9, wherein said electronic circuit further comprises a pair of power amplifiers for providing said first and second audio outputs as power output signals for direct connection to said pair of speakers.

16. The electronic device of claim 9, wherein said electronic circuit generates said first audio output signal to include low frequency portions of both said main and surround channel information, generates said second audio output signal to include high frequency portions of both said main and surround channel information, and generates said first and second audio output signals to include midrange portions of said surround channel information in said controlled signal relationship, whereby only a midrange portion of said surround channel information is provided in said directivity pattern.

17. An audio device, comprising:

a pair of internal speakers;

a stereo audio output connection;

a source of audio program information; and an electronic circuit for receiving surround channel information and main channel information and supplying a first set of signals to said pair of internal speakers and a second pair of signals to said stereo audio output connection, wherein said electronic circuit has a selectable operating mode, wherein at least one of said first and second pairs of signals are generated in dependence on both said surround channel information and said main channel information when a first operating mode is selected, and wherein said first signal and said second signal have a controlled response to said surround channel information when said first operating mode is selected, such that propagation of said surround channel information is provided in a directivity pattern having substantial attenuation along a direct path to a predetermined listening position and at least one lobe having a directivity peak directed away from said predetermined listening position, when a pair of speakers in proximity of less than one meter to audio device are each coupled to said stereo audio output connection, and wherein said first pair of signals is generated from said main channel information and said second pair of signals is generated from said surround channel information when a second operating mode is selected, such that the main channel information is provided in the first pair of signals and the surround channel information is provided separately in the second pair of signals.

18. The audio device of claim 17, wherein said source of audio program information is an input for receiving said program information from an external device.

* * * * *